(12) United States Patent
Wang et al.

(10) Patent No.: US 7,441,449 B2
(45) Date of Patent: Oct. 28, 2008

(54) AIR FILTER RESTRICTION MONITORING WITHOUT PRE-THROTTLE PRESSURE SENSORS

(75) Inventors: Wenbo Wang, Novi, MI (US); Michael A. Kropinski, Troy, MI (US); Kurt D. Mc Lain, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 98 days.

(21) Appl. No.: 11/626,579

(22) Filed: Jan. 24, 2007

(65) Prior Publication Data

US 2008/0223123 A1 Sep. 18, 2008

(51) Int. Cl.
*G01M 15/00* (2006.01)
(52) U.S. Cl. .................................. 73/114.31
(58) Field of Classification Search .............. 73/114.31, 73/114.32, 114.33, 114.36, 114.37
See application file for complete search history.

(56) References Cited

U.S. PATENT DOCUMENTS

| 5,604,306 | A  | * | 2/1997  | Schricker ............... 73/114.31 |
| 7,032,573 | B2 | * | 4/2006  | Ardisana ................... 123/434 |
| 7,178,410 | B2 | * | 2/2007  | Fraden et al. ............ 73/861.52 |
| 7,305,301 | B1 | * | 12/2007 | Wang et al. ................ 701/114 |
| 2005/0240338 | A1 | * | 10/2005 | Ardisana ................... 701/114 |

OTHER PUBLICATIONS

U.S. Appl. No. 11/464,340, filed Aug. 14, 2006.

* cited by examiner

*Primary Examiner*—Eric S McCall

(57) ABSTRACT

A method of monitoring air flow restriction in an air intake of an internal combustion engine includes recording a predetermined number of pre-throttle pressure samples, recording a predetermined number of mass air flow samples, which respectively correspond to the pre-throttle pressure samples and determining a slope based on the pre-throttle pressure samples and the mass air flow samples. Whether an air filter is inducing an air flow over restriction is determined based on the slope.

21 Claims, 6 Drawing Sheets

AIR FILTER RESTRICTION MONITORING WITHOUT PRE-THROTTLE PRESSURE SENSORS

FIELD

The present disclosure relates to internal combustion engines, and more particularly to monitoring restricted air flow through a filter without implementing a pre-throttle pressure sensor.

BACKGROUND

The statements in this section merely provide background information related to the present disclosure and may not constitute prior art.

Internal combustion engines combust a fuel and air mixture to produce drive torque. More specifically, air is drawn into the engine through a throttle. The air is mixed with fuel and the air and fuel mixture is compressed within a cylinder using a piston. The air and fuel mixture is combusted within the cylinder to reciprocally drive the piston within the cylinder, which in turn rotationally drives a crankshaft of the engine.

Engine operation is regulated based on several parameters including, but not limited to, intake air temperature ($T_{PRE}$), manifold absolute pressure (MAP), throttle position (TPS) and engine RPM. With specific reference to the throttle, the state parameters (e.g., air temperature and pressure) before the throttle are good references that can be used for engine control and diagnostic. For example, proper functioning of the throttle can be monitored by calculating the flow through the throttle for a given throttle position and then comparing the calculated air flow to a measured or actual air flow. As a result, the total or stagnation air pressure before the throttle (i.e., the pre-throttle air pressure) is critical to accurately calculate the flow through the throttle. Alternatively, the total pressure and/or static pressure can be used to monitor air filter restriction.

An air filter is often used in an internal combustion engine to remove contamination from the induction air. Over a period of use the air filter can become plugged and restrict the air flow into the engine. This can reduce performance, reduce fuel economy and increase engine emissions. Therefore, it is important to determine whether air flow is restricted as a result of the air filter.

Traditional internal combustion engines include a pre-throttle pressure sensor that directly measures the pre-throttle pressure. Accordingly, a traditional engine system is able to diagnose air flow restriction resulting from an air filter if up-stream and down-stream pressure sensors are available. However, such additional hardware increases cost and manufacturing time, and is also a maintenance concern because proper operation of the sensors must be monitored and the sensors must be replaced if not functioning properly.

SUMMARY

Accordingly, the present invention provides a method of monitoring air flow restriction in an air intake of an internal combustion engine. The method includes recording a predetermined number of pre-throttle pressure samples, recording a predetermined number of mass air flow samples, which respectively correspond to the pre-throttle pressure samples and determining a slope based on the pre-throttle pressure samples and the mass air flow samples. Whether an air filter is inducing an air flow over restriction is determined based on the slope.

In one feature, the steps of recording occur when a throttle position and an engine RPM are greater than respective thresholds.

In other features, the step of determining a slope occurs when a delta mass air flow value is greater than a delta threshold. A maximum mass air flow value is determined from the mass air flow samples and a minimum mass air flow value is determined from the mass air flow samples. The delta mass air flow value is calculated as a difference between the maximum mass air flow value and the minimum mass air flow value.

In still another feature, the method further includes determining a linear regression line based on the pre-throttle pressure samples and the mass air flow samples. The slope corresponds to the linear regression line.

In yet other features, each of the pre-throttle pressure samples is determined by determining an intermediate parameter based on engine operating parameters and determining a pre-throttle pressure sample based on the intermediate parameter. A pressure ratio is determined based on the intermediate parameter and the pressure ratio is set equal to a constant value if the intermediate parameter is not less than a threshold value.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
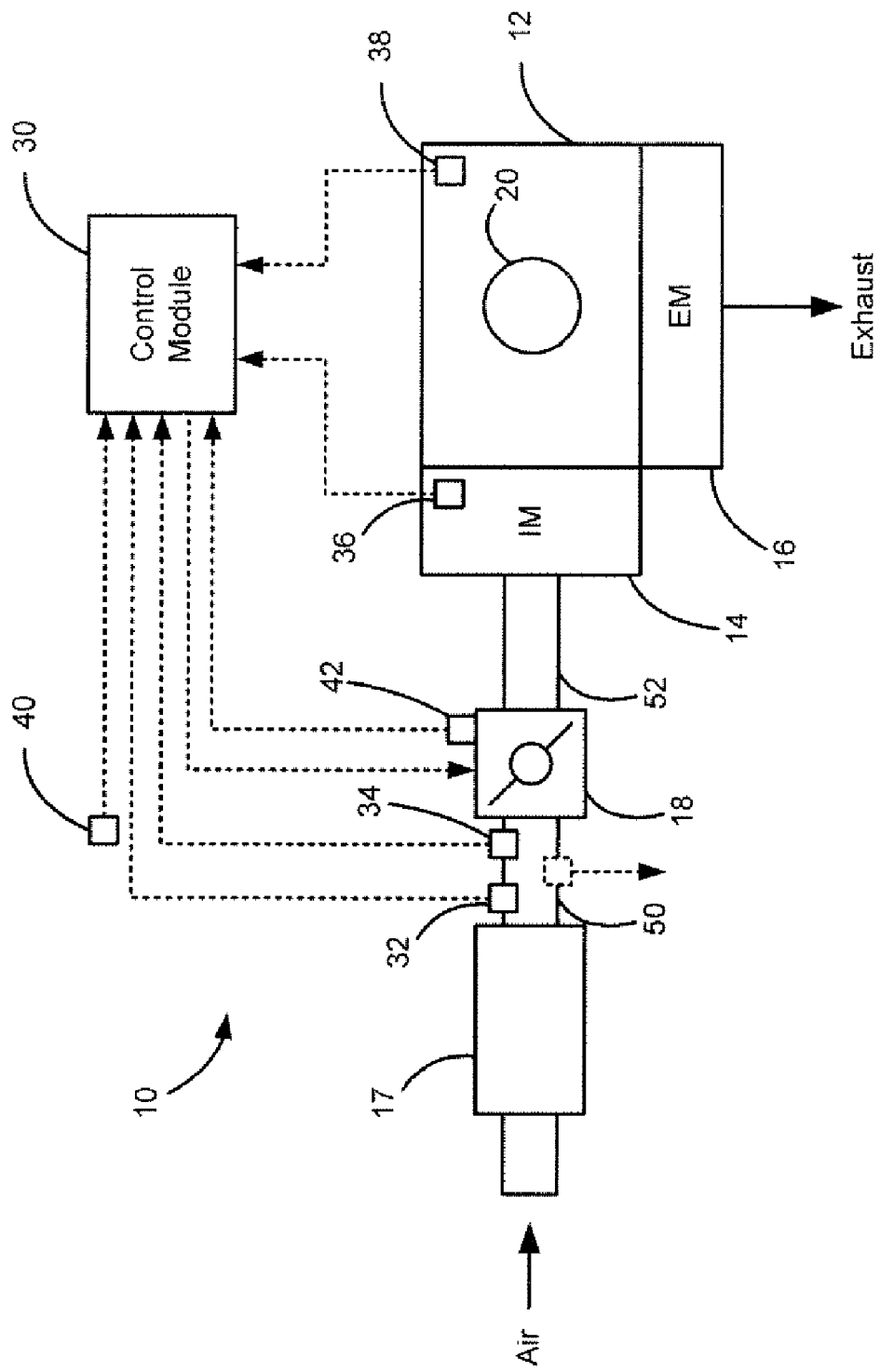
FIG. 1 is a functional block diagram of an internal combustion engine system that is regulated in accordance with the air flow restriction control of the present disclosure.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary internal combustion engine system 10 is illustrated. The engine system 10 includes an engine 12, an intake manifold 14 and an exhaust manifold 16. Air is drawn into the intake manifold 14 through an air filter 17 and a throttle 18. The air is mixed with fuel, and the fuel and air mixture is combusted within a cylinder 20 of the engine 12. More specifically, the fuel and air mixture is compressed within the cylinder 20 by a piston (not shown) and combustion is initiated. The combustion process releases energy that is used to reciprocally drive the piston within the cylinder 20. Exhaust that is generated by the combustion process is exhausted through the exhaust manifold 16 and is treated in an exhaust after-treatment system (not shown) before being released to atmosphere. Although a single cylinder 20 is illustrated, it is anticipated that the pre-throttle estimation control of the present invention can be implemented with engines having more than one cylinder.

A control module 30 regulates engine operation based on a plurality of engine operating parameters including, but not limited to, a pre-throttle static pressure ($P_{PRE}$), a pre-throttle stagnation pressure ($P_{PRE0}$) (i.e., the air pressures upstream of the throttle), an intake air temperature ($T_{PRE}$), a mass air flow (MAF), a manifold absolute pressure (MAP), an effective throttle area ($A_{EFF}$) and an engine RPM. $P_{PRE0}$ and $P_{PRE}$ are determined based on a pre-throttle estimation control, which is disclosed in commonly assigned, co-pending U.S. patent application Ser. No. 11/464,340, filed on Aug. 14, 2006.

$T_{PRE}$, MAF, MAP and engine RPM are determined based on signals generated by a $T_{PRE}$ sensor 32, a MAF sensor 34, a MAP sensor 36 and an engine RPM sensor 38, respectively, which are all standard sensors of an engine system. $A_{EFF}$ is determined based on a throttle position signal that is generated by a throttle position sensor, which is also a standard sensor. A barometric pressure ($P_{BARO}$) is monitored using a barometric pressure sensor 40. A throttle position sensor 42 generates a throttle position signal (TPS). The relationship between $A_{EFF}$ to TPS is pre-determined using engine dynamometer testing with a temporary stagnation pressure sensor (shown in phantom in FIG. 1) installed. Production vehicles include the relationship pre-programmed therein and therefore do not require the presence of the stagnation pressure sensor.

The pre-throttle pressure estimation control of U.S. patent application Ser. No. 11/464,340 determines $P_{PRE}$ and $P_{PRE0}$ based on engine operating parameters including, but not limited to MAF, $A_{EFF}$, $T_{PRE}$ and MAP. More specifically, the throttle 18 and the associated pre and post air passages 50, 52, respectively, are provided as a control volume and the air flow therethrough is treated as a one-dimensional, quasi-steady state compressible gas flow. Accordingly, the following relationship is provided:

$$MAF = A_{EFF} \cdot \Phi \cdot \frac{P_{PRE0}}{\sqrt{R \cdot T_{PRE0}}} \quad (1)$$

where $P_{PRE0}$ is the pre-throttle stagnation pressure (i.e., the pressure that the air would reach if it were brought to zero speed, via a steady, adiabatic, quasi-static process with no external work) measured in kPa, $T_{PRE0}$ is the pre-throttle stagnation temperature (i.e., the temperature that the fluid would reach if it were brought to zero speed by a steady, adiabatic process with no external work) measured in K, R is the ideal gas constant for air (i.e., 288.17 Nm/(kg·K)). $\phi$ is a unit-less coefficient equal to 0.6847 for sonic air flow (i.e., where MAP/$P_{PRE0}$ is less than 0.528) and is determined based on the following relationship for sub-sonic air flow:

$$\Phi = \left[ \frac{2k}{k-1} \left( P_R^{\frac{2}{k}} - P_R^{\frac{k+1}{k}} \right) \right]^{1/2} \quad (2)$$

where k is the ratio of specific heats for air (i.e., 1.4) and $P_R$ is equal to the ratio of MAP to $P_{PRE0}$. $T_{PRE0}$ is determined based on the following relationship:

$$T_{PRE0} = T_{PRE} + \frac{k-1}{2 \cdot k \cdot R} V^2 \quad (3)$$

where V is the air velocity upstream of the throttle and is determined based on the MAF signal, $\rho$ and the throttle intake pipe geometry. $\rho$ is the air density (kg/m³) and can be assumed to be the same value as ambient air because the flow through air filter system has such a low Mach number (e.g., <<0.3) that it can be treated as incompressible air flow.

Equations 1 and 2 can be combined to provide the following relationship:

$$\Phi \cdot P_{PRE0} = \frac{MAF \cdot \sqrt{R \cdot T_{PRE0}}}{A_{EFF}} \quad (4)$$

Dividing both sides of Equation 4 by MAP provides:

$$\Phi \cdot \frac{P_{PRE0}}{MAP} = \frac{MAF \cdot \sqrt{R \cdot T_{PRE0}}}{MAP \cdot A_{EFF}} \quad (5)$$

which can be rewritten to provide:

$$\frac{\Phi}{P_R} = \frac{MAF \cdot \sqrt{R \cdot T_{PRE0}}}{MAP \cdot A_{EFF}} \quad (6)$$

An intermediate parameter ($\phi_{NEW}$) is defined based on Equation 6 to provide the following relationship:

$$\Phi_{NEW} = \frac{\Phi}{P_R} = \frac{MAF \cdot \sqrt{R \cdot T_{PRE0}}}{MAP \cdot A_{EFF}} \quad (7)$$

Accordingly, for sonic air flow (i.e., $P_R$<0.528), $\phi_{NEW}$ is provided as:

$$\Phi_{NEW} = \frac{0.6847}{0.528} = 1.2968$$

For sub-sonic air flow (i.e., $P_R \geq 0.528$), $\phi_{NEW}$ is provided as:

$$\Phi_{NEW} = \frac{\left[\frac{2k}{k-1}\left(P_R^{\frac{2}{k}} - P_R^{\frac{k+1}{k}}\right)\right]^{1/2}}{P_R} \quad (8)$$

Figure 2:
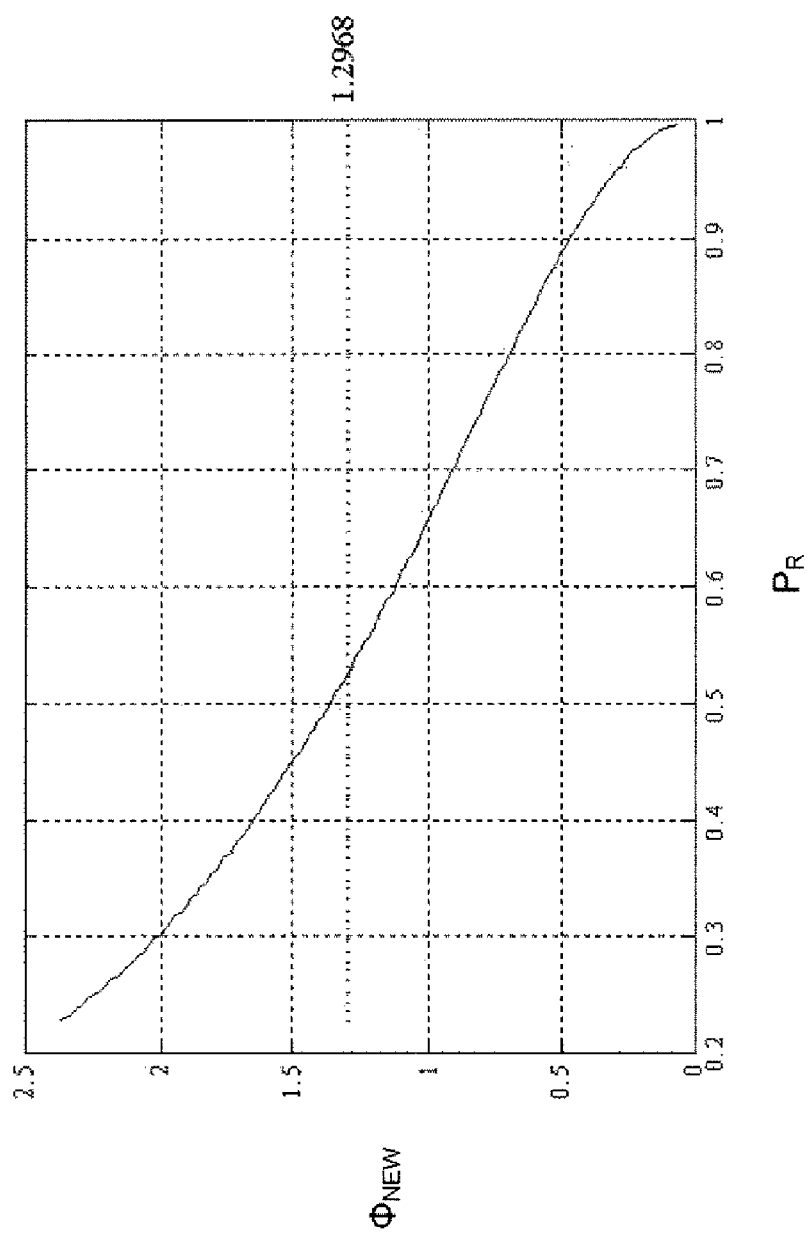
FIG. 2 is a graph that graphically illustrates an exemplary look-up table for determining a pressure ratio based on an intermediate value.

$P_{PRE0}$ is determined by first calculating $\phi_{NEW}$ based on MAF, R, $T_{PRE0}$, $A_{EFF}$ and MAP in accordance with Equation 7. If $\phi_{NEW}$ is greater than or equal to 1.2968 (i.e., sonic air flow) $\phi$ is clamped to 0.6847 and $P_{PRE0}$ is determined based on Equation 4. As provided above, $P_R$ is set equal to a constant (C) (e.g., 0.528) for sonic air flow. If $\phi_{NEW}$ is less than a threshold value ($X_{THR}$) 1.2968 (i.e., sub-sonic air flow), $P_R$ is calculated based on $\phi_{NEW}$. More specifically, $P_R$ can be calculated using Equation 8 or can be determined using a look-up table. An exemplary look-up table is graphically illustrated in FIG. 2.

$P_{PRE0}$ value can be determined by dividing MAP by $P_R$, and is used to control engine operation and/or for diagnostics. For example, during engine control, $P_{PRE0}$, MAF, MAP and $T_{PRE0}$ can be used to calculate the throttle position. If the air flow into the engine needs to change, the change in throttle position can be predicted for the current air flow to the desired air flow. $P_{PRE0}$, along with other parameters, can be used to calculate a theoretical MAF, which is comparable to that determined by the MAF sensor. In this manner, it can be determined whether the MAF sensor and/or the throttle is/are functioning properly. As a result, throttle position error and/or MAF error can be diagnosed, depending on what other conditions are known.

The pre-throttle estimation control also provides the following relationship:

$$P_{PRE0} = P_{PRE} + \frac{\rho \cdot V^2}{2} \quad (9)$$

Accordingly, $P_{PRE}$ is determined based on $P_{PRE0}$ using Equation 9. $P_{PRE}$ can also be used to control engine operation and for diagnostics. For example, during engine control, $P_{PRE}$, MAF, $P_{BARO}$ and $T_{PRE0}$ can be used to calculate or monitor the air filter restriction conditions.

$P_{PRE0}$ can be measured directly during calibration of the engine operating parameters, for example, when calibrating $A_{EFF}$ versus throttle position. More specifically, calibrating $A_{EFF}$ versus throttle position, $P_{PRE0}$ is concurrently measured to correspond to the $A_{EFF}$ and throttle position values with other parameters such as $T_{PRE}$, MAF and MAP. In this manner, the $P_{PRE0}$ estimation provided by the present invention is accurate during post-calibration engine operation. Alternatively, $P_{PRE0}$ can be calculated from a measured $P_{PRE}$ and calculated air flow velocity using Equation 9.

The air flow restriction control of the present disclosure determines whether the air filter is sufficiently dirty that the air flow is unacceptably restricted and the air filter should be replaced. More specifically, the pre-throttle pressure is determined as a function of engine widely available parameters such as MAF, TPS, IAT, and MAP, as described in detail above. The difference between the measured barometer pressure and calculated pre-throttle pressure is checked to diagnose the air filter status in a mid range of scenarios.

Figure 3:
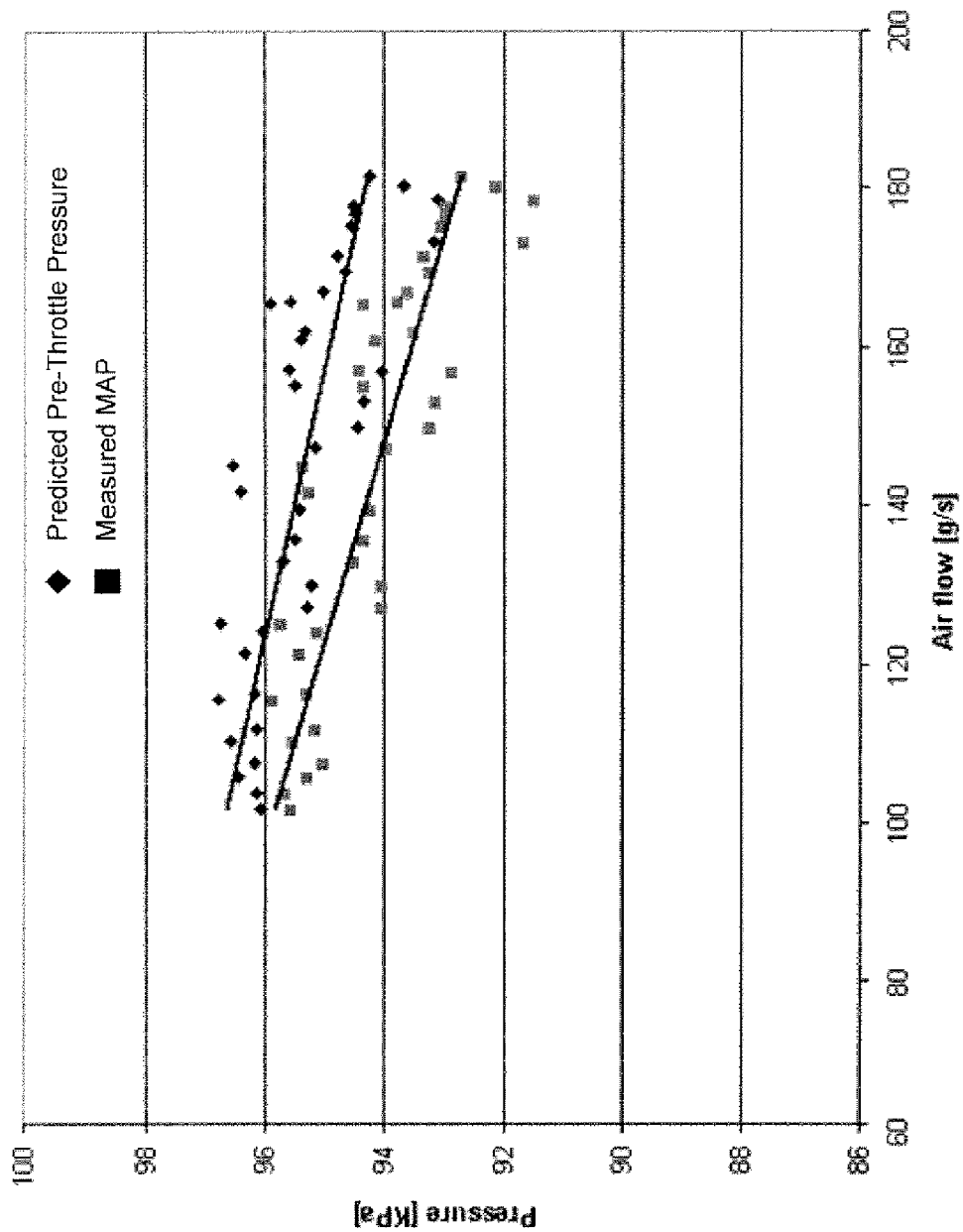
FIG. 3 is a graph that illustrates exemplary plots of pre-throttle stagnation pressure and measured MAP as a function of mass air flow associated with a clean air filter.
Figure 4:
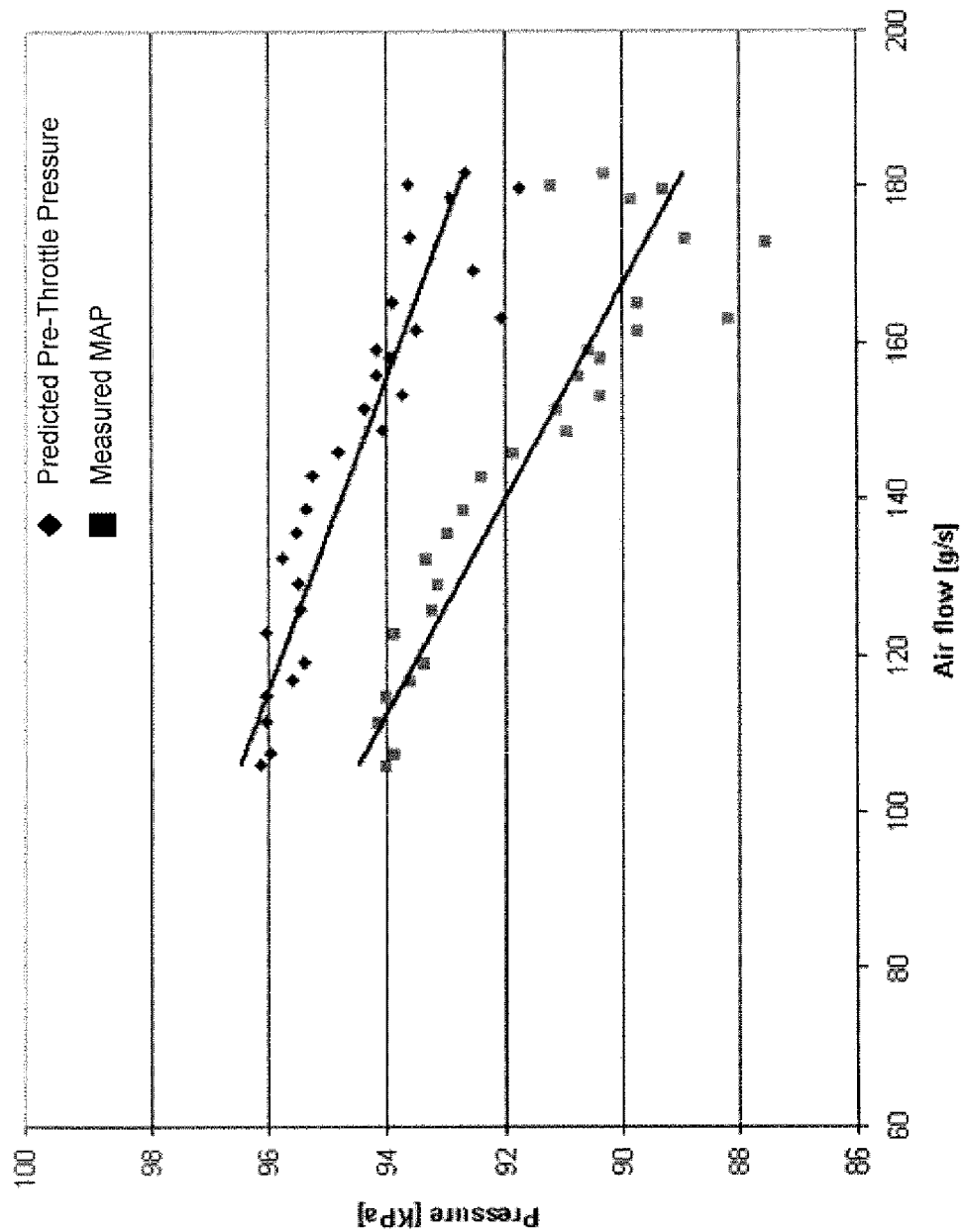
FIG. 4 is a graph that illustrates exemplary plots of pre-throttle stagnation pressure and measured MAP as a function of mass air flow associated with a dirty air filter.

FIG. 3 illustrates measured MAP and predicted pre-throttle pressure over measured MAF for an engine with a clean air filter. FIG. 4 shows the similar data with a dirty or plugged air filter. Linear regression lines are provided based on the data plots. The slopes of the regression lines of the dirty filter is nearly double those of the clean. Accordingly, the air filter restriction control of the present disclosure determines a slope (m) based on a predicted pre-throttle pressure differential and a MAF differential. If m is greater than a threshold slope ($m_{THR}$), the air filter is over or undesirably restricting the air flow. If m is less than or equal to $m_{THR}$, the air filter is not over or undesirably restricting the air flow.

The benefit of using pre-throttle pressure instead of measured MAP is to comprehend the impact of the nonlinear compressible flow across throttle body and different throttle positions. The difference of barometric pressure minus the pre-throttle pressure can be used for above slope calculation and air filter restriction monitoring when a barometric pressure sensor is available. The advantage of using the slope of pre-throttle pressure to mass air flow under certain conditions is to minimize the impact of unknown barometer changes or inaccurate barometric pressure prediction when a barometric pressure sensor is not installed.

Figure 5:
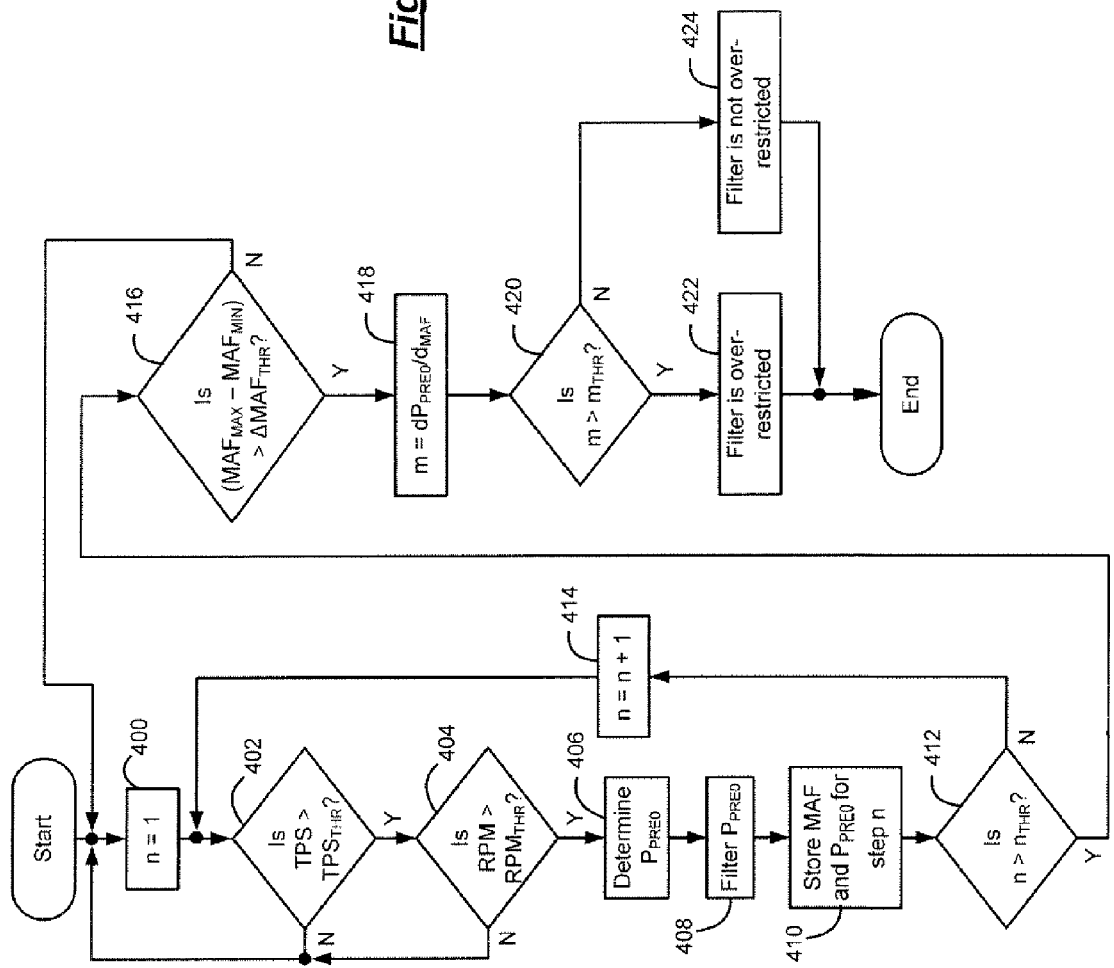
FIG. 5 is a flowchart illustrating exemplary steps that are executed by the air filter restriction control of the present disclosure.

Referring now to FIG. 5, exemplary steps that are executed by the air flow restriction control will be described in detail. In step 400, a counter n is set equal to 1. In step 402, control determines whether the TPS is greater than a threshold TPS ($TPS_{THR}$). If the TPS is greater than $TPS_{THR}$, control continues in step 404. If TPS is not greater than $TPS_{THR}$, control loops back to step 400. Control determines whether the engine RPM is greater than a threshold RPM ($RPM_{THR}$). If RPM is greater than $RPM_{THR}$, control continues in step 406. If RPM is not greater than $RPM_{THR}$, control loops back to step 400. By initially checking the throttle and engine RPM conditions to ensure sufficient engine flow (if the flow is too low, the restriction loss through air filter is very small), control can also check vehicle mileage and/or engine run time within certain limits to ensure that the barometric pressure does not drastically change. This is particularly useful in the event that the barometric pressure sensor is not available.

In step 406, control determines the pre-throttle pressure as discussed in detail above. In step 408, control filters the predicted pre-throttle pressure. Control stores the pre-throttle pressure and MAF for step n in step 410. In step 412, control determines whether n is greater than a step threshold ($n_{THR}$). If n is not greater than $n_{THR}$, n is incremented in step 414 and loops back to step 402. In step 416, control determines whether the difference between the maximum MAF ($MAF_{MAX}$) and the minimum MAF ($MAF_{MIN}$), determined from the n samples stored in memory, is greater than a differential MAF threshold ($\Delta MAF_{THR}$). If the difference is not greater than $\Delta MAF_{THR}$, control loops back to step 400. If the difference is greater than $\Delta MAF_{THR}$, control continues in step 418.

In step 418, control calculates m based on a pre-throttle pressure differential and a MAF differential. Control determines whether m is greater than $m_{THR}$ in step 420. If m is greater than $m_{THR}$, control continues in step 422. If m is not greater than $m_{THR}$, control continues in step 424. In step 422, control indicates that the air filter is restricting air flow and control ends. In step 424, control indicates that the air filter is not restricting air flow and control ends.

Figure 6:
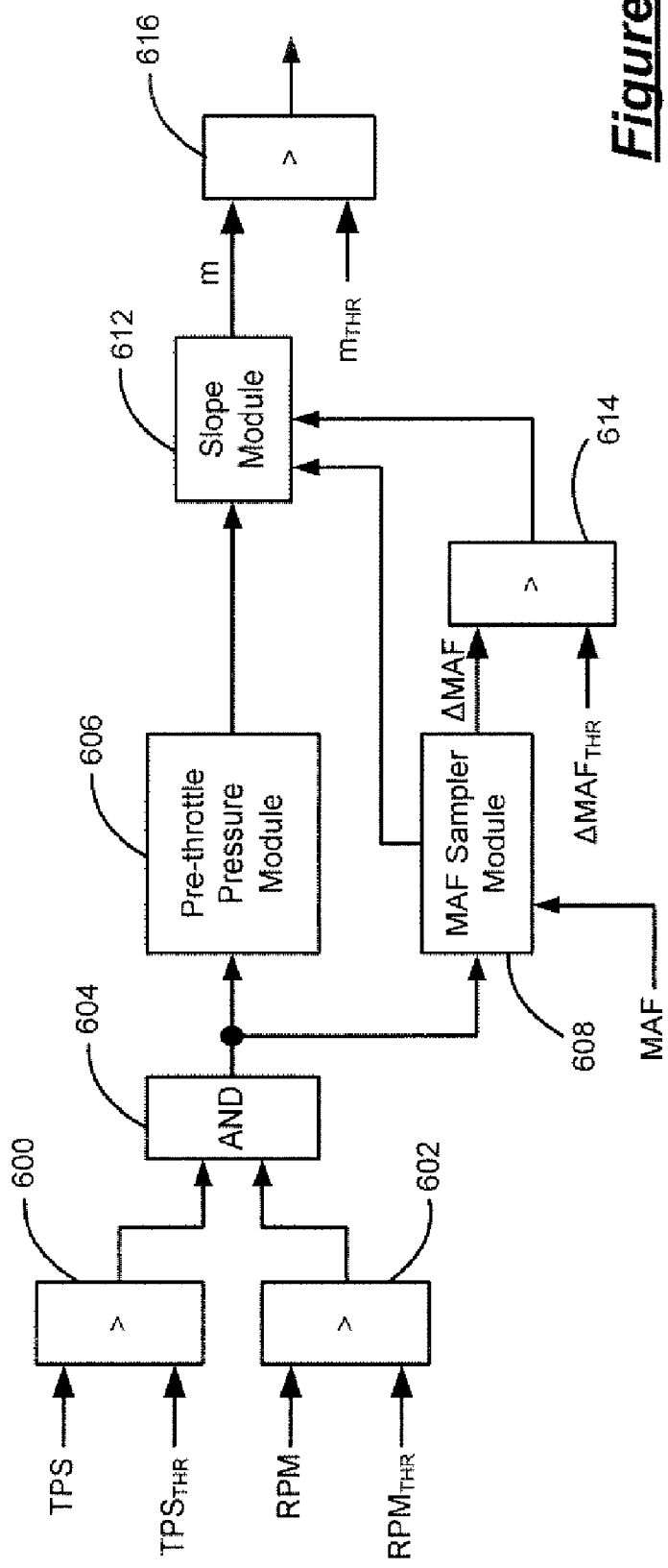
FIG. 6 is a functional block diagram illustrating exemplary modules that execute the air filter restriction control.

Referring now to FIG. 6, exemplary modules that execute the air flow restriction control will be described in detail. The exemplary modules includes comparator modules 600, 602, an AND gate 604, a pre-throttle pressure module 606, a MAF sampler module 608, a slope module 612 and comparator modules 614, 616. The comparator module 600 compares TPS to $TPS_{THR}$ and generates a signal (e.g., 1) if TPS is greater than $TPS_{THR}$. Similarly, the comparator module 602 compares RPM to $RPM_{THR}$ and generates a signal (e.g., 1) if RPM is greater than $RPM_{THR}$. The AND gate 604 receives the signals and generates a signal (e.g., 1) if the signals from the comparators indicate that TPS and RPM are both greater than their respective thresholds.

The pre-throttle pressure module 606 determines the pre-throttle pressure and records samples thereof when the AND gate 604 generates the appropriate signal (e.g., 1). Similarly, the MAF sampler module 608 monitors MAF and records samples thereof when the AND gate 604 generates the appropriate signal (e.g., 1). The slope module 612 receives the pre-throttle pressure and MAF values and calculates m when $\Delta$MAF (i.e., $MAF_{MAX}$ minus $MAF_{MIN}$) is greater than $\Delta MAF_{THR}$. More specifically, if $\Delta$MAF is greater than $\Delta MAF_{THR}$, the comparator module 614 generates a corresponding signal (e.g., 1), which is received by the slope module 612. The comparator module 616 generates a signal (e.g., 1) if m is greater than $m_{THR}$, which indicates that the air flow is over restricted. If m is not greater than $m_{THR}$, the comparator module 616 generates a corresponding signal (e.g., 0), which indicates that the air flow is not over restricted.

It is anticipated that the exemplary modules described above can be combined, as sub-modules, into a single module. For example, the pre-throttle pressure module 606 and the MAF sampler module 608 can be sub-modules of a single module.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of monitoring air flow restriction in an air intake of an internal combustion engine, comprising:
   recording a predetermined number of pre-throttle pressure samples;
   recording a predetermined number of mass air flow samples, which respectively correspond to said pre-throttle pressure samples;
   determining a slope based on said pre-throttle pressure samples and said mass air flow samples; and
   determining whether an air filter is inducing an air flow over restriction based on said slope.

2. The method of claim 1 wherein said steps of recording occur when a throttle position and an engine RPM are greater than respective thresholds.

3. The method of claim 1 wherein said step of determining a slope occurs when a delta mass air flow value is greater than a delta threshold.

4. The method of claim 3 further comprising:
   determining a maximum mass air flow value from said mass air flow samples; and
   determining a minimum mass air flow value from said mass air flow samples;
   wherein said delta mass air flow value is calculated as a difference between said maximum mass air flow value and said minimum mass air flow value.

5. The method of claim 1 further comprising determining a linear regression line based on said pre-throttle pressure samples and said mass air flow samples, wherein said slope corresponds to said linear regression line.

6. The method of claim 1 wherein each of said pre-throttle pressure samples is determined by:
   determining an intermediate parameter based on engine operating parameters; and
   determining a pre-throttle pressure sample based on said intermediate parameter.

7. The method of claim 6 further comprising:
   determining a pressure ratio based on said intermediate parameter; and
   setting said pressure ratio equal to a constant value if said intermediate parameter is not less than a threshold value.

8. A system for monitoring air flow restriction in an air intake of an internal combustion engine, comprising:
   a first module that records a predetermined number of pre-throttle pressure samples and that records a predetermined number of mass air flow samples, which respectively correspond to said pre-throttle pressure samples;
   a second module that determines a slope based on said pre-throttle pressure samples and said mass air flow samples; and
   a third module that determines whether an air filter is inducing an air flow over restriction based on said slope.

9. The system of claim 8 wherein said first module records said samples when a throttle position and an engine RPM are greater than respective thresholds.

10. The system of claim 8 wherein said second module determines said slope when a delta mass air flow value is greater than a delta threshold.

11. The system of claim 10 further comprising a third module determines a maximum mass air flow value from said mass air flow samples and determines a minimum mass air flow value from said mass air flow samples, wherein said delta mass air flow value is calculated as a difference between said maximum mass air flow value and said minimum mass air flow value.

12. The system of claim 8 wherein said second module determines a linear regression line based on said pre-throttle pressure samples and said mass air flow samples, wherein said slope corresponds to said linear regression line.

13. The system of claim 8 wherein each of said pre-throttle pressure samples is determined by:
   determining an intermediate parameter based on engine operating parameters; and
   determining a pre-throttle pressure sample based on said intermediate parameter.

14. The system of claim 13 further comprising a fourth module that determines a pressure ratio based on said intermediate parameter and that sets said pressure ratio equal to a constant value if said intermediate parameter is not less than a threshold value.

15. A method of monitoring air flow restriction in an air intake of an internal combustion engine, comprising:
   determining whether a plurality of operating parameter conditions are met;
   recording a predetermined number of pre-throttle pressure samples and mass air flow samples, which respectively correspond to said pre-throttle pressure samples when said plurality of operating parameters conditions are met;
   determining a slope based on said pre-throttle pressure samples and said mass air flow samples; and
   determining whether an air filter is inducing an air flow over restriction based on said slope.

16. The method of claim 15 wherein said plurality of operating parameter conditions are met when a throttle position and an engine RPM are greater than respective thresholds.

17. The method of claim 15 wherein said step of determining a slope occurs when a delta mass air flow value is greater than a delta threshold.

18. The method of claim 17 further comprising:
   determining a maximum mass air flow value from said mass air flow samples; and
   determining a minimum mass air flow value from said mass air flow samples;
   wherein said delta mass air flow value is calculated as a difference between said maximum mass air flow value and said minimum mass air flow value.

19. The method of claim 15 further comprising determining a linear regression line based on said pre-throttle pressure samples and said mass air flow samples, wherein said slope corresponds to said linear regression line.

20. The method of claim 15 wherein each of said pre-throttle pressure samples is determined by:
   determining an intermediate parameter based on engine operating parameters; and
   determining a pre-throttle pressure sample based on said intermediate parameter.

21. The method of claim 20 further comprising:
   determining a pressure ratio based on said intermediate parameter; and
   setting said pressure ratio equal to a constant value if said intermediate parameter is not less than a threshold value.

* * * * *